United States Patent [19]

Jouck et al.

[11] Patent Number: 5,322,715
[45] Date of Patent: Jun. 21, 1994

[54] PROCESS FOR PRODUCTION OF A MULTICOAT COATING

[75] Inventors: Walter Jouck; Bernd Mayer, both of Münster, Fed. Rep. of Germany; Stefan C. Wieditz, Sylvania, Ohio

[73] Assignee: BASF Lacke+Farber Aktiengesellschaft, Munster, Fed. Rep. of Germany

[21] Appl. No.: 862,578

[22] PCT Filed: Dec. 11, 1990

[86] PCT No.: PCT/EP90/02148
§ 371 Date: Jul. 28, 1992
§ 102(e) Date: Jul. 28, 1992

[87] PCT Pub. No.: WO91/09685
PCT Pub. Date: Jul. 11, 1991

[30] Foreign Application Priority Data

Dec. 23, 1989 [DE] Fed. Rep. of Germany ....... 3942804

[51] Int. Cl.$^5$ .............................................. B05D 7/14
[52] U.S. Cl. ................................. 427/409; 427/412.1; 427/419.1
[58] Field of Search ................. 427/409, 412.1, 419.1, 427/405

[56] References Cited

U.S. PATENT DOCUMENTS

| | | | |
|---|---|---|---|
| 3,823,205 | 7/1974 | Zimmt | 260/901 |
| 3,998,768 | 12/1976 | Pettit, Jr. | 526/320 |
| 4,150,005 | 4/1979 | Gehman et al. | 260/28.5 R |
| 4,151,143 | 4/1979 | Blank et al. | 260/29.6 RW |
| 4,385,152 | 5/1983 | Boyack et al. | 524/460 |
| 4,973,621 | 11/1990 | Buter | 524/460 |

FOREIGN PATENT DOCUMENTS

| | | |
|---|---|---|
| 2004988 | 9/1990 | Canada . |
| 2034334 | 6/1980 | United Kingdom . |
| 2060654 | 5/1981 | United Kingdom . |

Primary Examiner—Shrive Beck
Assistant Examiner—Erma Cameron
Attorney, Agent, or Firm—Anne Gerry Sabourin

[57] ABSTRACT

A process utilizing a pigmented aqueous basecoat composition which contains as the film-forming material a water-thinnable emulsion polymer. The water-thinnable emulsion polymer is prepared in a two-stage emulsion polymerization. In the first stage a polymer is prepared having a glass transition temperature ($T_{G1}$) of +30° to +110° C. In the second stage a mixture of monomers is polymerized in the presence of the polymer prepared in the first stage, which mixture, polymerized on its own, would give a polymer with a glass transition temperature ($T_{G2}$) of −60° to +20° C. The hydroxyl value of the emulsion polymer is between 2 and 100.

19 Claims, No Drawings

PROCESS FOR PRODUCTION OF A MULTICOAT COATING

The invention relates to a process for the production of a multicoat protective and/or decorative coating on a substrate surface, in which process
(1) a pigmented aqueous coating composition containing as the film-forming material a water-thinnable emulsion polymer is applied to the substrate surface as the basecoat coating composition
(2) a polymeric film is formed from the composition applied in stage (1)
(3) a suitable transparent topcoat coating composition is applied to the basecoat obtained in this manner and subsequently
(4) the basecoat together with the topcoat is dried at temperatures below 80° C.

The present invention also relates to a process for the production of a multicoat protective and/or decorative coating on a substrate surface in the automotive refinishing sector, in which process
(1) a pigmented aqueous coating composition containing as the film-forming material a water-thinnable emulsion polymer is applied to the substrate surface as the basecoat coating composition
(2) a polymeric film is formed from the composition applied in stage (1)
(3) a suitable transparent topcoat coating composition is applied to the basecoat obtained in this manner and subsequently
(4) the basecoat together with the topcoat is dried at temperatures below 100° C.

The process, described above, for the production of multicoat protective and/or decorative coatings is known and is employed in particular for the production of effect finishes on automobile bodies (cf. for example EP-A-89,497, DE-A-3,628,124 and EP-A-38,127).

With the process under discussion it is possible to produce metallic effect finishes having a good metallic effect only if the composition of the aqueous basecoat coating compositions employed is such that they can be applied to the substrate in relatively thin films. which dry rapidly at low temperatures below 100° C. and which, after stages (3) and (4) of the process have been carried out, have the metal pigment particles arranged in a direction parallel with the surface of the substrate.

Furthermore, the composition of the aqueous basecoat coating compositions must be such that the basecoat of the metallic finishes adheres well to the substrate and the transparent topcoat adheres well to the basecoat. In addition, the composition of the aqueous basecoat coating compositions must be such that the dried metallic effect finish suffers no loss of gloss, loss of adhesion or even blistering after exposure to a condensation-water cycling test.

It is finally desirable that the aqueous basecoat coating compositions exhibit a long shelf life. In addition, the individual binders and/or paint components stored under certain circumstances in an anhydrous state must still be homogeneously miscible after storage.

Aqueous basecoat coating compositions which contain as the film-forming material a mixture of a water-thinnable emulsion polymer and a water-thinnable polyurethane resin, are disclosed in DE-A-3,628,124. These basecoat coating compositions do not comply with the above requirements in an optimum manner, in particular as regards drying temperatures <100° C.

Furthermore, a process for the formation of coatings is known from German Patent 3,600,425, in which process a priming composition and a topcoat composition are applied and the coatings are cured in a temperature range between room temperature and about 140° C. The primer contains a resin of a given molecular weight range having a hydroxyl group or a hydroxyl and a carboxyl group in the molecule as well as a catalyst, if appropriate. The curing component is contained in the topcoat and not in the primer.

A process for the formation of multicoat coatings is known from EP-A-287,144, in which process the basecoat contains a dispersion of an emulsion polymer produced by a 2-stage process. In the first stage of this process high proportions, however, of 65 to 100 mol % of (cyclo)alkyl esters of (meth)acrylic acid and, if appropriate, of fumaric and/or maleic acid are employed, in which case the (cyclo)alkyl radical comprises 4 to 12 carbon atoms, as a result of which the resultant polymers have very low Tg values. Furthermore, in the second stage high proportions of 10 to 60 mol % of (meth)acrylic acid are employed, as a result of which the resultant polymers have very high acid values.

Finally, a process is described in Patent Application DE 3,841,540, not yet published, in which a water-thinnable basecoat and, after a brief flash-off period, a topcoat coating composition is applied. This process differs from the present process in that in the DE 3,841,540 process the basecoat is baked together with the topcoat at temperatures at or above 80° C. In addition, the basecoat coating compositions described therein contain advantageously an aminoplast resin, while in the present process the basecoat coating compositions preferably contain precisely no aminoplast resin.

The object forming the basis of the present invention consists in providing for the process under discussion suitable aqueous basecoat coating compositions which fulfil the above requirements to an optimum degree.

Surprisingly, this object is achieved by aqueous basecoat coating compositions which contain a water-thinnable emulsion polymer which is obtainable in that
(a) in the first stage 10 to 90 parts by weight of an ethylenically unsaturated monomer or a mixture of ethylenically unsaturated monomers is polymerized in the aqueous phase in the presence of one or more emulsifiers and one or more radical-forming initiators, the ethylenically unsaturated monomer or the mixture of ethylenically unsaturated monomers being chosen such that in the first stage a polymer having a glass transition temperature ($T_{G1}$) of $+30°$ to $+110°$ C. is obtained, and after at least 80% by weight of the ethylenically unsaturated monomer or mixture of monomers employed in the first stage have reacted, in a second stage 90 to 10 parts by weight of an ethylenically unsaturated monomer or a mixture of ethylenically unsaturated monomers are polymerized in the presence of the polymer obtained in the first stage, the monomer employed in the second stage or the mixture of ethylenically unsaturated monomers employed in the second stage being chosen such that a sole polymerization of the monomer employed in the second stage or of the mixture of ethylenically unsaturated monomers employed in the second stage gives rise to a polymer having a glass transition temperature ($T_{G2}$) of $-60°$ to $+20°$ C., and the reaction conditions being chosen such that the resultant emulsion polymer has a number average molecular weight of 200,000 to 2,000,000, and the ethylenically unsaturated monomer or mixture of monomers employed in the first stage and the nature and amount of the ethylenically unsaturated monomer or mixture of monomers employed in the second stage being chosen such that the resultant emulsion polymer has a hydroxyl value of 2 to 100 mg of KOH/g and the difference $T_{G1}-T_{G2}$ is 10° to 170° C.

The water-thinnable emulsion polymers employed according to the invention can be prepared by a two-stage emulsion polymerization in an aqueous medium in known equipment, for example in a stirred reaction vessel provided with heating and cooling facilities. The addition of the monomers can be carried out in such a manner that a solution consisting of the total water, the emulsifier and some of the initiator is introduced in the vessel and the monomer or mixture of monomers and, separately but at the same time, the remainder of the initiator are slowly added at the polymerization temperature. However, it is also possible first to introduce in the vessel some of the water and the emulsifier and from the remainder of the water and the emulsifier and from the monomer or mixture of monomers to prepare a preemulsion which is slowly added at the polymerization temperature, the initiator being again added separately.

It is preferred in the first stage to add the monomer or mixture of monomers in the form of a preemulsion and in the second stage to add the monomer or mixture of monomers as such, i.e. without water or emulsifier, and to add the initiator separately but at the same time. It is particularly preferred in the first stage to prepare from some of the preemulsion to be used in the first stage (usually about 30% by weight of the total of the preemulsion to be used) a seed polymer and then to add the remainder of the preemulsion to be used in the first stage.

The polymerization temperature is generally in the range of 20° to 100° C., preferably 40° to 90° C.

The ratio of the amount of the monomer to the amount of water can be chosen such that the resultant dispersion has a solids content of 30 to 60% by weight, preferably 35 to 50% by weight.

An anionic emulsifier either alone or in admixture is preferably used as the emulsifier.

Examples of anionic emulsifiers are the alkali metal salts of sulfuric acid hemiesters of alkylphenols or alcohols, furthermore sulfuric acid hemiesters of oxethylated alkylphenols or oxethylated alcohols, preferably the alkali metal salts of the sulfuric acid hemiester of a nonylphenol which has been reacted with 4-5 mol of ethylene oxide per mol, alkyl- or aryl-sulfonates, sodium lauryl sulfate, sodium lauryl ethoxylate sulfate and secondary sodium alkane sulfonates whose carbon chain contain 8-20 carbon atoms. The amount of the anionic emulsifier is 0.1-5.0% by weight, based on the monomers, preferably 0.5-3.0% by weight. Furthermore, in order to increase the stability of the aqueous dispersions, a non-ionic emulsifier of the type of an ethoxylated alkylphenol or fatty alcohol, for example an addition product of 1 mol of nonylphenol and 4-30 mol of ethyleneoxide in admixture with the anionic emulsifier may be additionally employed.

A peroxide compound is preferably used as the radical-forming initiator. The initiator is water-soluble or monomer-soluble. A water-soluble initiator is preferably employed.

Suitable initiators are the usual inorganic percompounds such as ammonium persulfate, potassium persulfate, ammonium or alkali metal peroxydiphosphate and organic peroxides, such as, for example, benzoyl peroxide, organic peresters such as perisopivalate, partly in combination with reducing agents such as sodium disulfite, hydrazine, hydroxylamine and catalytic amounts of an accelerator such as iron, cobalt, cerium or vanadyl salts. Alkali metal or ammonium peroxydisulfates are preferably used. The redox initiator systems disclosed in EP-A-107,300 may also be used.

In the first stage 10 to 90, preferably 35 to 65 parts by weight of an ethylenically unsaturated monomer or a mixture of ethylenically unsaturated monomers are emulsion polymerized. The monomer or monomer mixture used in the first stage is chosen such that when the polymerization of the monomer or mixture of monomers used in the first stage has reached completion, a polymer having a glass transition temperature ($T_{G1}$) of +30° C. to 110° C. preferably 60° to 95° C., is obtained. Since the glass transition temperature of emulsion polymers can be approximately calculated from the equation $$\frac{1}{T_G} = \sum_{n=1}^{n=x} \frac{W_n}{T_{Gn}}$$

$T_G$ = glass transition temp. of the copolymer in K
$W_n$ = weight of the nth monomer
$T_{Gn}$ = glass transition temp. of the homopolymer obtained from the nth monomer
$x$ = number of the various monomers A person skilled in the art has no difficulties in choosing the monomer or mixture of monomers to be used in the first stage such that when the polymerization of the monomer or mixture of monomers used in the first stage has reached completion, a polymer having a glass transition temperature ($T_{G1}$) of +30° to +110° C., preferably 60° to 95° C., is obtained.

Examples of monomers which can be used in the first stage, are: vinylaromatic hydrocarbons such as styrene, α-alkylstyrene and vinyltoluene, esters of acrylic acid or methacrylic acid, in particular aliphatic and cycloaliphatic acrylates or methacrylates having up to 20 carbon atoms in the alcohol radical, such as, for example, methyl, ethyl, propyl, butyl, hexyl, ethylhexyl, stearyl, lauryl and cyclohexyl acrylate or methacrylate, acrylic and/or methacrylic acid, acryl- and/or methacrylamide, N-methylolacrylamide and/or N-methylolmethacrylamide, hydroxyalkyl esters of acrylic acid, methacrylic acid or another α,β-ethylenically unsaturated carboxylic acid, such as, for example, 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate etc.

The ethylenically unsaturated monomers or mixtures of ethylenically unsaturated monomers used in the first stage are preferably those which are essentially free from hydroxyl and carboxyl groups. The expression "essentially free" is intended to mean that it is preferred to use monomers or mixtures of monomers which are free from hydroxyl or carboxyl groups, but that the monomers or mixtures of monomers employed may also contain small amounts (for example due to impurities) of hydroxyl and/or carboxyl groups. The hydroxyl and- /or carboxyl group content should preferably be at most so high that the polymer prepared from the monomer or mixture of monomers used in the first stage has a hydroxyl value of not more than 5 mg of KOH/g and an acid value of not more than 3 mg of KOH/g.

A mixture consisting of (a1) 100 to 60, preferably 99.5 to 75% by weight of a cycloaliphatic or aliphatic ester of methacrylic acid or acrylic acid or a mixture of such esters and (a2) 0 to 40, preferably 0.5 to 25% by weight of a monomer which is copolymerizable with (a1) or a mixture of such monomers is preferably used in the first stage, the total of the weights of (a1) and (a2) being always 100% by weight.

The following may be used, for example, as the component (a1): cyclohexyl acrylate, cyclohexyl methacrylate, alkyl acrylates and alkyl methacrylates having up to 20 carbon atoms in the alkyl radical, such as, for example, methyl, ethyl, propyl, butyl, hexyl, ethylhexyl, stearyl and lauryl acrylate and methacrylate or mixtures of these monomers.

The following may be used, for example, as the component (a2): vinylaromatic hydrocarbons such as styrene, α-alkylstyrene and vinyltoluene, acryl- and methacrylamide and acrylo- and methacrylonitrile or mixtures of these monomers.

After at least 80% by weight, preferably at least 95% by weight, of the monomer or mixture of monomers used in the first stage have reacted, 90 to 10, preferably 65 to 35 parts by weight, of an ethylenically unsaturated monomer or a mixture of ethylenically unsaturated monomers are emulsion polymerized in the second stage in the presence of the polymer obtained in the first stage, the monomer or mixture of monomers used in the second stage being chosen such that a sole polymerization of the monomer or mixture of monomers used in the second stage gives rise to a polymer having a glass transition temperature ($T_{G2}$) of $-60°$ to $+20°$ C., preferably $-50°$ to $0°$ C. This choice is not difficult for a person skilled in the art, since the approximate glass transition temperatures of emulsion polymers-as already stated above-can be readily calculated.

It is furthermore an essential part of the invention that the nature and amount of the monomer or mixture of monomers used in the first stage and of the monomer or mixture of monomers used in the second stage are chosen such that the resultant emulsion polymer has a hydroxyl value of 2 to 100 mg of KOH/g, preferably of 10 to 50 mg of KOH/g and the difference $T_{G1}-T_{G2}$ is $10°$ to $170°$ C., preferably $80°$ to $150°$ C.

Examples of monomers which can be used in the second stage, are as follows: vinylaromatic hydrocarbons such as styrene, α-alkylstyrene and vinyltoluene, esters of the acrylic acid or methacrylic acid, in particular aliphatic and cycloaliphatic acrylates or methacrylates having up to 20 carbon atoms in the alcohol radical, such as, for example, methyl, ethyl, propyl, butyl, hexyl, ethylhexyl, stearyl, lauryl and cyclohexyl acrylate or methacrylate, acrylic and/or methacrylic acid, acryl-and/or methacrylamide, N-methylolacrylamide and/or N-methylolmethacrylamide, hydroxyalkyl esters of acrylic acid, methacrylic acid or another α,β-ethylenically unsaturated carboxylic acid, such as, for example, 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate etc. A mixture consisting of (b1) 47 to 99, preferably 75 to 90% by weight of a cycloaliphatic or aliphatic ester of methacrylic acid or acrylic acid or a mixture of such esters (b2) 1 to 20, preferably 5 to 15% by weight of a monomer which is copolymerizable with (b1), (b3) and (b4) and carries at least one hydroxyl group or a mixture of such monomers (b3) 0 to 8, preferably 2 to 6% by weight of a monomer which is copolymerizable with (b1), (b2) and (b4) and carries at least one carboxyl or sulfonic acid group or a mixture of such monomers and (b4) 0 to 25, preferably 2 to 15% by weight of a further monomer which is copolymerizable with (b1), (b2) and (b3) or a mixture of such monomers is preferably used in the second stage, the total of the weights of (b1), (b2), (b3) and (b4) being always 100% by weight.

The following may be used, for example, as the component (b1): cyclohexyl acrylate, cyclohexyl methacrylate, alkyl acrylates and alkyl methacrylates having up to 20 carbon atoms in the alkyl radical, such as, for example, methyl, ethyl, propyl, butyl, hexyl, ethylhexyl, stearyl and lauryl acrylate and methacrylate or mixtures of these monomers.

The following can be used, for example, as the component (b2): hydroxyalkyl esters of acrylic acid, methacrylic acid or of another α,β-ethylenically unsaturated carboxylic acid. These esters may be derived from an alkylene glycol esterified with the acid or they may be obtained by reacting the acid with an alkylene oxide. Hydroxyalkyl esters of acrylic acid and methacrylic acid in which the hydroxyalkyl group contains up to 4 carbon atoms, or mixtures of these hydroxyalkyl esters, are preferably used as the component (b2). Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate or 4-hydroxybutyl methacrylate. The corresponding esters of other unsaturated acids, such as, for example, ethacrylic acid, crotonic acid and similar acids having up to about 6 carbon atoms per molecule may likewise be used.

Acrylic acid and/or methacrylic acid and/or acrylamidomethyl propane sulfonic acid are preferably used as the component (b3). However, other ethylenically unsaturated acids having up to 6 carbon atoms in the molecule may also be used. Examples of such acids are ethacrylic acid, crotonic acid, maleic acid, fumaric acid and itaconic acid.

The following can be used, for example, as the component (b4): vinylaromatic hydrocarbons such as styrene, α-alkylstyrene and vinyltoluene, acryl- and methacrylamide and acrylo- and methacrylonitrile or mixtures of these monomers.

The emulsion polymer used according to the invention should have a number average molecular weight (determination by gel permeation chromatography using polystyrene as standard) of 200,000 to 2,000,000, preferably 300,000 to 1,500,000 as well as acid values usually below 100 mg of KOH/g and hydroxyl values of 2 to 100 mg of KOH/g. If the emulsion polymer contains no acid groups (approximate acid value of below 3 mg of KOH/g) or only very few, it is advantageous to add to the coating composition a carboxyl-containing resin, for example a carboxyl-containing polyurethane, polyester or polyacrylate resin. The amounts of the carboxyl-containing resin should be chosen such that the acid value of the mixture of the emulsion polymer and the carboxyl-containing resin is 10 mg of KOH/g higher.

A person skilled in the art knows how to choose the reaction conditions prevailing during the emulsion polymerization so that he obtains emulsion polymers which possess the number average molecular weightes stated above (cf. for example Chemie, Physik und Technologie der Kunststoffe in Einzeldarstellungen, Dispersionen synthetischer Hochpolymerer, [Chemistry, Physics and Technology of Plastics Considered Separatly, Dispersions of Synthetic High Polymers] Part 1, by F. Hölscher, Springer Verlag, Berlin, Heidelberg, N.Y., 1969).

The aqueous basecoat coating compositions according to the invention may contain, in addition to the emulsion polymer described above, also a water-thinnable polyurethane resin as the film-forming material.

The basecoat coating compositions according to the invention may contain, for example, if appropriate, also water-thinnable polyurethane resins containing urea groups which have a number average molecular weight (determination by gel permeation chromatography using polystyrene as standard) of 1,000 to 250,000, preferably 1,500 to 20,000 and an acid value of 5 to 70 mg of KOH/g, preferably 10 to 30 mg of KOH/g, and may be prepared by a reaction, preferably chain extension, of prepolymers containing isocyanate groups with polyamines and/or hydrazine.

The preparation of the isocyanate-containing prepolymers may be carried out by a reaction of polyalcohols having a hydroxyl value of 10 to 1800, preferably 50 to 500 mg of KOH/g, with excess polyisocyanates at temperatures up to 150° C., preferably 50° to 130° C., in organic solvents which are incapable of reacting with isocyanates. The equivalent ratio of NCO to OH groups is between 1.5 to 1.0 and 1.0 to 1.0, preferably between 1.4 and 1.2 to 1. The polyols used for the preparation of the prepolymers may be low-molecular and/or high-molecular and they may contain slow-reacting anionic groups.

In order to increase the hardness of the polyurethane, low-molecular polyols may be employed. They have a molecular weight of 60 up to about 400, and may contain aliphatic, alicyclic or aromatic groups. The amounts used are up to 30% by weight of the total polyol components, preferably about 2 to 20% by weight. The low-molecular polyols are preferably those having up to about 20 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di(trimethylolpropane)ether, pentaerythritol, 1,2-cyclohexanediol, 1,4-cyclohexanedimethanol, bisphenol A, bisphenol F, neopentyl glycol, neopentyl glycol ester of hydroxypivalic acid, hydroxyethylated or hydroxypropylated bisphenol A, hydrogenated bisphenol A and mixtures thereof.

In order to obtain an NCO prepolymer of higher flexibility, it is necessary to add a high proportion of a predominantly linear polyol having a preferred hydroxyl value of 30 to 150 mg of KOH/g. Up to 97% by weight of the total polyol may consist of saturated or unsaturated polyesters and/or polyethers having a molecular weight Mn of 400 to 5000. Suitable high-molecular polyols are aliphatic polyether diols of the general formula H—(—O—(—CHR)$_n$—)$_m$—OH wherein R is hydrogen or a low alkyl radical which is unsubstituted or substituted by various substituents, n being 2 to 6, preferably 3 to 4, and m being 2 to 100, preferably 5 to 50. Suitable examples are linear or branched polyether diols such as poly(oxyethylene) glycols, poly(oxypropylene) glycols and/or poly(oxybutylene) glycols. The polyether diols chosen should not introduce an excess of ether groups, since otherwise the formed polymers swell up in water. The preferred polyether diols are poly(oxypropylene) glycols in the molecular weight range Mn of 400 to 3000. Polyester diols are prepared by esterification of organic dicarboxylic acids or their anhydrides with organic diols or they are derived from a hydroxycarboxylic acid or a lactone. For the preparation of branched polyester polyols it is possible to use to a limited extent polyols or polycarboxylic acids of a higher valency. The dicarboxylic acids or diols may be linear or branched aliphatic, cycloaliphatic or aromatic dicarboxylic acids or diols.

The diols used for the preparation of the polyesters may consist, for example, of alkylene glycols, such as ethylene glycol, propylene glycol, butylene glycol, 1,4-butanediol, 1,6-hexanediol, neopentyl glycol and other diols such as dimethylcyclohexane. The acid components of the polyester consists in the first instance of low-molecular dicarboxylic acids or their anhydrides having 2 to 30, preferably 4 to 18 carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, provided they exist. Small amounts of carboxylic acids having 3 or more carboxylic groups, for example trimellithic anhydride or the adduct of maleic anhydride with unsaturated fatty acids may also be present in the formation of polyester polyols.

Polyester diols which are obtained by reacting a lactone with a diol, are also used according to the invention. They are distinguished by the presence of a terminal hydroxyl group and recurring polyester units of the formula —(—CO—(CHR)$_n$—CH$_2$—O—)—. In this formula n is preferably 4 to 6 and the substituent R is hydrogen, an alkyl, cycloalkyl or alkoxy radical. No substituent contains more than 12 carbon atoms. The total number of carbon atoms in the substituents does not exceed 12 per lactone ring. Corresponding examples are hydroxycaproic acid, hydroxybutyric acid, hydroxydecanoic acid and/or hydroxystearic acid. The lactone used as starting material may be represented by the following general formula

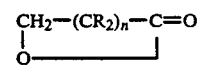

in which n and R have the meaning already stated. The unsubstituted ε-caprolactone in which n has the value of 4 and all R substituents are hydrogen, is preferred for the preparation of the polyester diols. The reaction with the lactone is initiated by low-molecular polyols such as ethylene glycol, 1,3-propanediol, 1,4-butanediol and dimethylolcyclohexane. However, other reactants such as ethylenediamine, alkyldialkolamines as well as urea may be reacted with caprolactone.

Suitable high-molecular diols are polylactam diols obtainable by the reaction of, for example, ε-caprolactam with low-molecular diols.

Aliphatic, cycloaliphatic and/or aromatic polyisocyanates having at least two isocyanate groups per molecule are used as typical multifunctional isocyanates. Isomers or isomeric mixtures of organic diisocyanates are preferred. Suitable aromatic diisocyanates are phenylene diisocyanate, toluylene diisocyanate, xylylene diisocyanate, biphenylene diisocyanate, naphthylene diisocyanate and diphenylmethane diisocyanate.

Because of their good resistance to ultraviolet light, (cyclo)aliphatic diisocyanates give rise to products with a low tendency to yellowing. Corresponding examples are isophorone diisocyanate, cyclopentylene diisocyanate as well as hydrogenation products of aromatic diisocyanates such as cyclohexylene diisocyanate, methylcyclohexylene diisocyanate and dicyclohexylmethane diisocyanate. Examples of aliphatic diisocyanates are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Isophorone diisocyanate and dicyclohexylmethane diisocyanate are particularly preferred as the diisocyanates.

The polyisocyanate component used for the formation of the prepolymer may also contain a proportion of higher-valent polyisocyanates, provided that this does not lead to gelling. Products which are formed by trimerization or oligomerization of diisocyanates or by a reaction of diisocyanates with compounds containing polyfunctional OH or NH groups have been found satisfactory as triisocyanates. Examples of such compounds are the biuret of hexamethylene diisocyanate and water, the isocyanurate of hexamethylene diisocyanate or the adduct of isophorone diisocyanate and trimethylolpropane.

If appropriate, the average functionality can be reduced by the addition of monoisocyanates. Examples of such chain-breaking monoisocyanates are phenyl isocyanate, cyclohexyl isocyanate and stearyl isocyanate.

Polyurethanes are generally not compatible with water, unless during their synthesis special components are incorporated and/or special preparative steps are undertaken. Thus the acid value incorporated is so high that the neutralized product can be dispersed in water to produce a stable dispersion. Suitable compounds for this purpose are those which contain two H-active groups reacting with isocyanate groups and at least one group capable of forming anions. Suitable groups reacting with isocyanate groups are in particular hydroxyl groups as well as primary and/or secondary amino groups. Groups capable of forming anions are carboxyl groups, sulfonic acid groups and/or phosphonic acid groups. Carboxylic acid groups or carboxylate groups are preferred. They should be so slow to react that the isocyanate groups of the diisocyanate preferably react with the other groups of the molecule which are reactive toward isocyanate groups. Alkanoic acids having two substituents on the carbon atom in α position are used for this purpose. The substituent may be a hydroxyl group, an alkyl group or an alkylol group.

These polyols have at least one, in general 1 to 3 carboxyl groups in the molecule. They have two to about 25, preferably 3 to 10 carbon atoms. Examples of such compounds are dihydroxypropionic acid, dihydroxysuccinic acid and dihydroxybenzoic acid. A particularly preferred group of dihydroxyalkanoic acids are the α,α-dimethylolalkanoic acids which are characterized by the structural formula $RC(CH_2OH)_2COOH$, in which R is hydrogen or an alkyl group having up to about 20 carbon atoms. Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of amino-containing compounds are, -diaminovaleric acid, 3,4-diaminobenzoic acid, 2,4-diaminotoluenesulfonic acid and 2,4-diaminodiphenyl ether sulfonic acid. The carboxyl-containing polyol may form 3 to 100% by weight, preferably 5 to 50% by weight, of the total polyol component in the NCO prepolymers.

The amount of ionizable carboxyl groups available in salt form by the neutralization of the carboxyl groups is generally at least 0.4% by weight, preferably at least 0.7% by weight, based on the solids. The upper limit is about 6% by weight. The amount of dihydroxyalkanoic acids in non-neutralized prepolymers produces an acid value of at least 5, preferably at least 10. The upper limit for the acid value is about 70, preferably about 40 mg of KOH/g, based on the solids.

Prior to reacting with isocyanates, this dihydroxyalkanoic acid is preferably at least partially neutralized with a tertiary amine in order to prevent a reaction with the isocyanates.

The NCO prepolymers used according to the invention may be prepared by a simultaneous reaction of the polyol or polyol mixture with excess diisocyanate.

Alternatively the reaction may be also carried out in stages in the prescribed sequence.

Examples are described in DE-OS-2,624,442 and DE-OS-3,210,051. The reaction is carried out at temperatures of up to 150° C., a temperature in the range of 50° to 130° C. being preferred. The reaction is continued until virtually all hydroxyl functions have reacted.

The NCO prepolymer contains at least about 0.5% by weight of isocyanate groups, preferably at least 1% by weight of NCO, based on the solids. The upper limit is about 15% by weight, preferably 10% by weight, particularly preferably about 5% by weight. If desired, the reaction may be carried out in the presence of a catalyst such as organotin compounds and/or tertiary amines. In order to maintain the coreactants in a liquid state and to allow better temperature control during the reaction, it is possible to add organic solvents which contain no Zerewitinoff-active hydrogen. Examples of suitable solvents are dimethylformamide, esters, ethers such as diethylene glycol dimethyl ether, ketoesters, ketones such as methyl ethyl ketone and acetone, ketones substituted with methoxy groups such as methoxyhexanone, glycol ether esters, chlorinated hydrocarbons, aliphatic and alicyclic hydrocarbons, pyrrolidones such as N-methylpyrrolidone, hydrogenated furans, aromatic hydrocarbons and mixtures thereof. The amount of solvent can vary within wide limits and it should be sufficient for the formation of a polymer solution of suitable viscosity. Amounts of 0.01 to 15% by weight of solvent, preferably 0.02 to 8% by weight of solvent, based on the solids, are in most cases adequate. If any water-insoluble solvents have a boiling point lower than that of water, they may be carefully removed by vacuum distillation or thin-layer evaporation after the preparation of the urea-containing polyurethane dispersion.

Higher-boiling solvents should be water-soluble and remain in the aqueous polyurethane dispersion in order to facilitate coalescence of the polymer particles during film formation. N-methylpyrrolidone, possibly in admixture with ketones such as methyl ethyl ketone, is particularly preferred as solvent.

The anionic groups of the NCO prepolymer are at least partially neutralized with a tertiary amine. The increase in water dispersibility thus obtained is sufficient to provide an infinite thinnability. It is also sufficient to disperse the neutralized polyurethane containing urea groups to a stable dispersion. Examples of suitable tertiary amines are trimethylamine, triethylamine, dimethylethylamine, diethylmethylamine and N-methylmorpholine. The NCO prepolymer is thinned with water after neutralization and gives then rise to a finely divided dispersion. Shortly afterwards the isocyanate groups still present are reacted with diamines and-/or polyamines having primary and/or secondary amino groups as chain extenders. This reaction leads to a further linkage and increase of the molecular weight. In order to obtain optimum properties, the competing reaction with the isocyanate between amine and water must be well adjusted (duration, temperature, concentration) and, to ensure reproducible production, well supervised. Water-soluble compounds are preferred as chain extenders, because they increase the dispersibility of the polymeric end product in water. Hydrazine and organic diamines are preferred, because they usually produce the highest molecular weight without the resin gelling. For this to be true it is assumed, however, that the ratio of the amino groups to the isocyanate groups is chosen expediently. The amount of the chain extender will depend on its functionality, the NCO content of the prepolymer and duration of the reaction. The ratio of the active hydrogen atom in the chain extender to the NCO groups in prepolymers should usually be less than 2:1 and preferably within the range of 1.0:1 to 1.75:1. The presence of excess active hydrogen, especially as primary amino groups, can lead to polymers of undesirably low molecular weight.

The polyamines are essentially alkylene polyamines having 1 to 40 carbon atoms, preferably about 2 to 15 carbon atoms. They may carry substituents which have no hydrogen atoms capable of reacting with isocyanate groups. Examples are polyamines with linear or branched aliphatic, cycloaliphatic or aromatic structure and having at least two primary amino groups. Suitable diamines are ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine, 4,4'-diaminodicyclohexylmethane and aminoethylethanolamine. Preferred diamines are alkyldiamines or cycloalkyldiamines such as propylenediamine and 1-amino-3-aminomethyl-3,5,5-trimethylcyclohexane.

The chain extension can be carried out at least partially with a polyamine which has at least three amino groups containing a reactive hydrogen. This type of polyamine can be used in such an amount that unreacted amine nitrogen atoms having 1 or 2 reactive hydrogen atoms are present after the extension of the polymer. Polyamines capable of being used in this manner are diethylenetriamine, triethylenetetraamine, dipropylenetriamine and dibutylenetriamine. Preferred polyamines are the alkyl- or cycloalkyltriamines such as diethylenetriamine. In order to prevent any gelling during chain extension, a small amount of monoamines, such as ethylhexylamine, may be added.

The water-thinnable polyurethane resins to be used according to the invention and the preparation thereof are also described in EP-A-89,497 and U.S. Pat. No. 4,719,132.

The emulsion polymer or mixture of emulsion polymer and polyurethane resin contained in the preferred aqueous basecoat compositions as the film-forming material consists of 100 to 40% by weight of emulsion polymer and 0 to 60% by weight of polyurethane resin, the amounts in each case based on the solids content and their total being always 100% by weight.

Besides the emulsion polymer or the mixture of emulsion polymer and polyurethane resin, the aqueous basecoat coating compositions according to the invention may also advantageously contain, if desired, further compatible water-thinnable synthetic resins, such as, for example, aminoplast resins, polyesters and polyethers, the purpose of which in general is to act as grinding resins for the pigments.

The aqueous basecoat coating compositions according to the invention may contain, if desired, 5 to 20% by weight, based on the total solids content of the basecoat coating compositions, of a water-thinnable aminoplast resin, preferably melamine resin, and 5 to 20% by weight of a water-thinnable polyether (for example polypropylene glycol having a number average molecular weight of 400 to 900. It is preferred, however, not to add any aminoplast resin to the basecoat coating compositions, since the resistance of the coatings to the condensation-water cycling test is thereby increased.

The basecoat coating compositions according to the invention may contain as pigments inorganic colored pigments such as, for example, titanium dioxide, iron oxide, carbon black etc., organic colored pigments as well as the customary metal pigments (for example, commercial aluminum bronzes, stainless steel bronzes . . . ) and non-metallic effect pigments (for example nacreous luster pigments and interference pigments). The basecoat coating compositions according to the invention preferably contain metal pigments and/or effect pigments. The degree of pigmentation lies within the customary range, preferably 0 to 10% by weight, based on the total weight of the basecoat coating composition.

Furthermore, crosslinked polymeric micro-particles, such as those disclosed in EP-A-38,127, and/or the customary rheologic inorganic or organic additives in usual amounts, for example 0.05 to 6% by weight, based on the total weight of the basecoat coating composition, may be further added to the basecoat coating compositions according to the invention. The following are thus examples of thickeners: inorganic stratified silicates such as, for example, aluminum-magnesium silicates, sodium-magnesium stratified silicates and sodium-magnesium-fluorine-lithium stratified silicates of the montmorillonite type, water-soluble cellulose ethers such as hydroxyethyl cellulose, methyl cellulose or carboxymethyl cellulose as well as synthetic polymers having ionic and/or associatively acting groups, such as polyvinyl alcohol, poly(meth)acrylamide, poly(meth)acrylic acid, polyvinylpyrrolidone, styrene-maleic anhydride or ethylene-maleic anhydride copolymers and derivatives thereof or also hydrophobically modified ethoxylated urethanes or polyacrylates. A combination of carboxyl-containing polyacrylate copolymer having an acid value of 60 to 780, preferably 200 to 500 mg of KOH/g, and a sodium-magnesium stratified silicate is particularly preferred. Particularly preferred basecoat coating compositions with improved resistance of the coatings to the condensation-water cycling test are obtained when the sodium-magnesium stratified silicate is used in the form of an aqueous paste. Particularly preferred pastes contain either 3% by weight of stratified silicate and 3% by weight of polypropylene glycol or 2% by weight of stratified silicate and 2% by weight, in each case based on the total weight of the paste, of other commercial surface-active substances.

The basecoat coating compositions according to the invention generally possess a solids content of about 15 to 50% by weight. The solids content varies with the intended application of the coating compositions. For metallic colored paints it is, for example, preferably about 17 to 25% by weight. For solid color paints it is higher, for example, about 30 to 45% by weight.

The coating compositions according to the invention may additionally contain the customary organic solvents. Their amount should be kept as low as possible. It is, for example, below 15% by weight.

The pH of the basecoat coating compositions according to the invention is generally adjusted to between 6.5 and 9.0. The pH can be adjusted using the customary amines, such as, for example, ammonia, triethylamine, dimethyl aminoethanol and N-methylmorpholine. By making available the basecoat coating compositions according to the invention the object started at the outset is achieved.

Coatings of high quality, may be prepared using the basecoat coating compositions according to the invention even without their being coated with a transparent topcoat coating composition.

The basecoat coating compositions according to the invention may be applied to any substrate such as, for example, metal, wood, plastics or paper.

After a brief flash-off period of generally at least 5 minutes for a polymeric film to form, a suitable transparent topcoat coating composition is applied to the basecoat obtained in this manner. Both organic solvent-borne and water-borne 1-component and 2-component clear varnishes are suitable as the topcoat coatings. Frequently used clear varnishes are those based on an hydroxyl-containing acrylate copolymer and a blocked polyisocyanate. Clear varnishes of this type are described, for example, in the patent applications DE 3,412,534, DE 3,609,519, DE 3,731,652 and DE 3,823,005. The moisture-curing clear varnishes based on polyaddition polymers containing alkoxysilane or acryloxysilane units and described in the international patent application WO88/02010 are also suitable.

Following a flash-off period of about 5 minutes which may be necessary, the basecoat together with the topcoat is dried at temperatures of 100° C., preferably of below 80° C. The dry film thicknesses of the basecoat are generally between 5 and 20 μm, those of the topcoat generally between 30 and 70 μm.

Using the process according to the invention it is possible to achieve even in the automotive refinishing sector, i.e. with the drying of the coatings being carried out at temperatures below 100° C., coatings which have a good metallic effect, good adhesion to the filler, good adhesion between the basecoat and topcoat, good gloss and good resistance in the condensation-water cycling test according to DIN 50017.

The following examples explain the invention in further detail.

A. Preparation of the emulsion polymers

Emulsion polymer dispersion 1

1344 g of deionized water and 12 g of a 30% aqueous solution of the ammonium salt of the penta(ethylene glycol) nonyl phenyl ether sulfate (Fenopon ® EP 110 from GAF Corp., emulsifier 1) are introduced into a cylindrical jacketed glass vessel fitted with a stirrer, reflux condenser, inlet vessel with a stirrer, dropping funnel and thermometer and heated to 82° C. In the inlet vessel with a stirrer an emulsion is prepared from 720 g of deionized water, 24 g of emulsifier 1, 10.8 g of acrylamide, 864 g of methyl methacrylate and 216 g of n-butyl methacrylate. 30% by weight of this emulsion are added to the initial mixture. 28% by weight of a solution of 3.1 g of ammonium peroxodisulfate (ASP) in 188 g of deionized water is then added dropwise in the course of 5 minutes. An exothermic reaction sets in. The reaction temperature is kept between 82° and 88° C. 15 minutes after the addition of the ammonium peroxodisulfate solution is concluded the remaining 70% by weight of the emulsion is added together with the remaining 72% by weight of the ammonium peroxodisulfate solution in the course of one hour, the temperature being kept at 85° C. The mixture is subsequently cooled to 82° C. and a mixture of 842 g of n-butyl acrylate, 108 g of hydroxypropyl methacrylate, 43 g of methylmethacrylate, 43.2 g of methacrylic acid, 32.4 g of acrylamide and 5.4 g of eicosa(ethylene glycol)nonyl phenyl ether (Antarox ® CO 850 from GAF Corp., emulsifier 2) as well as 343 g of deionized water is added. When the addition is completed, the reaction mixture is kept at 85° C. for a further 1.5 hours. It is then cooled and the dispersion is passed through a fabric with a 30 μm mesh size. A finely divided dispersion having a non-volatile content of 45% by weight, a pH of 3.4, an acid value of 13 mg of KOH/g and a hydroxyl value of 20 mg of KOH/g is obtained.

Emulsion polymer disperson 2

1344 g of deionized water and 12 g of a 40% aqueous solution of the ammonium salt of the penta(ethylene glycol) nonyl phenyl ether sulfate (Fenopon ® EP 110 from GAF Corp., emulsifier 1) are introduced into a cylindrical jacketed glass vessel fitted with a stirrer, reflux condenser, inlet vessel with a stirrer, dropping funnel and thermometer and heated to 80° C. In the inlet vessel with a stirrer an emulsion is prepared from 720 g of deionized water, 24 g of emulsifier 1, 10.8 g of acrylamide, 518 g of methyl methacrylate, 292 g of n-butyl methacrylate and 205 g of styrene.

30% by weight of this emulsion are added to the initial mixture. A solution of 0.9 g of ammonium peroxodisulfate (ASP) in 55 g of deionized water is then added dropwise in the course of 5 minutes. An exothermic reaction sets in. The reaction temperature is kept between 80° and 85° C. 15 minutes after the addition of the above APS solution is terminated, a solution of 2.2 g of APS in 480 g of water is added in the course of 3 hours and the remaining 70% by weight of the above-mentioned emulsion are added in the course of one hour, the reaction temperature being kept at 80° C. When the addition of the emulsion has been terminated, the mixture is cooled to 77° C. and a mixture of 745 g of n-butyl acrylate, 119 g of methyl methacrylate, 108 g of hydroxypropyl methacrylate, 54 g of styrene, 42.7 g of ethylhexyl acrylate, 42.7 g of methacrylic acid, 21.6 g of acrylamide and 2.2 g of emulsifier 2 is added in the course of 2 hours. When the addition has been concluded, the reaction mixture is kept at 80° C. for a further 1.5 hours. It is then cooled and the dispersion is passed through a fabric with a 30 μm mesh size. A finely divided dispersion having a non-volatile content of 45% by weight, a pH of 3.8, an acid value of 13 mg of KOH/g and a hydroxyl value of 19 mg of KOH/g is obtained.

Emulsion polymer dispersion 3

1109 g of deionized water and 10 g of a 30% aqueous solution of the ammonium salt of the penta(ethylene glycol) nonyl phenyl ether sulfate (Fenopon® EP 110 from GAF Corp., emulsifier 1) are introduced into a cylindrical jacketed glass vessel fitted with a stirrer, reflux condenser, inlet vessel with a stirrer, dropping funnel and thermometer and heated to 82° C. In the inlet vessel with a stirrer an emulsion is prepared from 748.2 g of deionized water, 20.3 g of emulsifier 1, 9.0 g of acrylamide, 718.1 g of methyl methacrylate and 179.5 g of n-butyl methacrylate. 30% by weight of this emulsion are added to the initial mixture. 10% by weight of a solution of 7.2 g of ammonium peroxodisulfate in 305 g of deionized water is then added in the course of 5 minutes. An exothermic reaction sets in. The reaction temperature is kept between 82° and 88° C. 15 minutes after the addition of the ammonium peroxodisulfate solution has been concluded, the remaining 70% by weight of the emulsion together with the remaining 90% by weight of the ammonium peroxodisulfate solution are added in the course of 1 hour, the temperature being kept at 82° C. A mixture of 700 g of n-butyl acrylate, 89.8 g of hydroxypropyl methacrylate, 35.9 g of methyl methacrylate, 35.9 g of methacrylic acid, 26.9 g of acrylamide and 4.5 g of eicosa(ethylene glycol) nonyl phenyl ether (Antarox® CO 850 from GAF Corp., emulsifier 2) is added in the course of 2 hours. After the addition has been completed, the reaction mixture is kept at 82° C. for a further 1.5 hours. It is then cooled and the dispersion is passed through a fabric with a 30 μm mesh size. A finely divided dispersion having a non-volatile content of 45% by weight, a pH of 2.5, an acid value of 14 mg of KOH/g and a hydroxyl value of 20 mg of KOH/g is obtained.

Emulsion polymer dispersion 4

1344 g of deionized water and 12 g of a 30% aqueous solution of the ammonium salt of penta(ethylene glycol) nonyl phenyl ether sulfate (Fenopon® EP 110 from GAF Corp., emulsifier 1) are introduced into a cylindrical jacketed glass vessel fitted with a stirrer, reflux condenser, inlet vessel with a stirrer, dropping funnel and thermometer and heated to 82° C. In the inlet vessel with a stirrer an emulsion is prepared from 477 g of deionized water, 66.7 g of emulsifier 1, 10.8 g of acrylamide, 864 g of methyl methacrylate and 216 g of n-butyl methacrylate. 30% by weight of this emulsion are added to the initial mixture. 3.6% by weight of a solution of 8.6 g of ammonium peroxodisulfate in 183 g of deionized water are then added dropwise in the course of 5 minutes. An exothermic reaction sets in. The reaction temperature is kept between 82° and 88° C. 15 minutes after the addition of the ammonium peroxodisulfate solution has been concluded, the remaining 70% by weight of the emulsion are added together with the remaining 96.4% by weight of the ammonium peroxodisulfate solution in the course of 1 hour, the temperature being kept at 82° C. A mixture of 842 g of n-butyl acrylate, 108 g of hydroxypropyl methacrylate, 43.2 g of methyl methacrylate, 43.2 g of acryloamidomethylpropanesulfonic acid, 32.4 g of acrylamide and 66.7 g of emulsifier 1 and 5.4 g of eicosa (ethylene glycol) nonyl phenyl ether (Antarox® CO 850 from GAF Corp., emulsifier 2) is then added in the course of 2 hours. After the addition has been completed, the reaction mixture is kept for a further 1.5 hours at 82° C. It is then cooled and the dispersion is passed through a fabric of 30 μm mesh size. A finely divided dispersion with a non-volatile content of 46% by weight, a pH of 2.5, an acid value of 6 mg of KOH/g and a hydroxyl value of 19 mg of KOH/g is obtained.

Emulsion polymer dispersion 5

1344 g of deionized water and 12 g of a 30% aqueous solution of the ammonium salt of penta(ethylene glycol) nonyl phenyl ether sulfate (Fenopon® EP 110 from GAF Corp., emulsifier 1) are introduced into a cylindrical jacketed glass vessel fitted with a stirrer, reflux condenser, inlet vessel with a stirrer, dropping funnel and thermometer and heated to 82° C. In the inlet vessel with a stirrer an emulsion is prepared from 720 g of deionized water, 24 g of emulsifier 1, 43.2 g of acrylamide, 907 g of methyl methacrylate and 216 g of n-butyl methacrylate, 842 g of n-butyl acrylate, 108 g of hydroxypropyl methacrylate, 43.2 g of methacrylic acid and 5.4 g of emulsifier 2. 10% by weight of this emulsion are added to the initial mixture. A solution of 0.87 g of ammonium peroxodisulfate in 53 g of deionized water is then added dropwise in the course of 5 minutes. An exothermic reaction sets in. The reaction temperature is kept between 82° and 88° C. 15 minutes after the addition of the APS solution has been concluded, the remaining 90% by weight of the emulsion are added in the course of 3 hours and a solution of 2.23 g of APS in 478 g of deionized water is added in the course of 3.5 hours, the temperature being kept at 82° C.

After the addition has been completed, the reaction mixture is kept at 82° C. for a further 1.5 hours. It is then cooled and the dispersion is passed through a fabric of 30 μm mesh size. A finely divided dispersion with a non-volatile content of 45% by weight, a pH of 5.8, an acid value of 13 mg of KOH/g and a hydroxyl value of 20 mg of KOH/g is obtained.

B Preparation of the polyurethane resin used according to the invention

Polyurethane resin dispersion 1

570 g of a commercial polyester prepared from caprolactone and ethylene glycol, having a hydroxyl value of 196 mg of KOH/g, are dewatered at 100° C. for 1 hour in vacuo. 524 g of 4,4'-dicyclohexylmethane diisocyanate are added at 80° C. and the reaction mixture is kept at 90° C. until the isocyanate content is 7.52% by weight, based on the total initial weight. After cooling to 60° C. a solution of 67 g of dimethylolpropionic acid and 50 g of triethylamine in 400 g of N-methylpyrrolidone is added and the reaction mixture is stirred at 90° C. for 1 hour. The resultant mass is added to 1840 g of cold deionized water with vigorous stirring. 86 g of a 15% hydrazine solution are added to the resultant dispersion in the course of 20 minutes with vigorous stirring. The resultant very finely divided dispersion has a solids content of 35% and an efflux time of 27 seconds from a DIN cup 4.

Polyurethane resin dispersion 2

830 g of a polyester prepared of neopentyl glycol, 1,6-hexanediol and adipic acid, having a hydroxyl value of 135 mg of KOH/g and an acid value below 3 mg of KOH/g, are dewatered at 100° C. for 1 hour in vacuo. 524 g of 4,4'-dicyclohexylmethanediisocyanate are added at 80° C. and the reaction mixture is stirred at 90° C. until the content of free isocyanate groups is 6.18% by weight, based on the total initial weight. After cooling to 60° C. a solution of 67 g of dimethylpropionic acid and 50 g of triethylamine in 400 g of N-methylpyrrolidone is added and the reaction mixture is stirred for 1 hours at 90° C.

The resultant mass is added to 2400 g of cold deionized water with vigorous stirring. A finely divided dispersion is obtained. 80 g of a 30% aqueous solution of ethylenediamine are added to this dispersion in the course of 20 minutes with vigorous stirring. The resultant very finely divided dispersion has a solids content of 35% and an efflux time of 23 seconds from the DIN cup 4.

C Preparation of basecoat coating compositions 8.0 g of butyl glycol and 4.5 g of an aluminum bronze according to DE-OS-3,636,183 (aluminum content; 60% by weight) are stirred for 15 minutes with a high speed stirrer at 300-500 rpm. A mixture 1 is obtained.

The pH of 50 g of emulsion polymer dispersion 1, 2, 3 or 4 is adjusted to 6.9 with ammonia and 9.4 g of a 3.5% solution of a commercial polyacrylic acid thickener (Viscalex® HV 30 from Allied Colloids, pH 8.0) and 0.5 g of a commercial antifoam (BYK® 035) are added. The mixture 2 is obtained. To prepare the basecoat according to the invention, the mixtures 1 and 2 are mixed for 30 minutes at 800-1000 rpm and, if necessary, the pH of the mixture is then adjusted to 7.0 by the addition of a 25% aqueous ammonia solution. 60 g of a preswelled aqueous paste containing 2% by weight of an inorganic sodium-magnesium stratified silicate thickener and 2% weight, based on the weight of the paste, of polypropylene glycol (number average molecular weight=900), are added to this mixture with stirring. The viscosity is then adjusted to an efflux time of 16-25 sec. from a DIN cup 4 by the addition of deionized water.

The basecoat coating compositions according to the invention BCC1, BCC2, BCC3 and BCC 4 are obtained.

The basecoat coating composition BCC5 is obtained by incorporating 10 g of the polyurethane resin dispersion 1 into the mixture 2.

The basecoat coating compositions obtained in this manner have excellent shelf lives.

The basecoat coating compositions are sprayed by well-known methods onto a phosphated steel panel (Bonder 132) coated by a commercial electrocoating process and a commercial conventional (i.e. solvent-borne or water-borne) filler, after a flash-off period of 30 minutes coated by a commercial conventional 2-component clear varnish based on hydroxyl-containing acrylate copolymer and an isocyanate crosslinking agent and dried for 30 minutes at 60° C. The dry film thickness of the basecoat coating composition is 15 μm, that of the clear varnish 50 μm.

The metal effect finishes obtained in this manner possess a good metallic effect, good adhesion to the filler, good adhesion between basecoat and topcoat, good gloss and good resistance in the condensation-water cycling test according to DIN 50 017.

COMPARISON EXAMPLE

A basecoat coating composition prepared according to the above description and using the emulsion polymer dispersion 5 has an inadequate shelf life.

What is claim is:

1. A process for the production of a multicoat protective and/or decorative coating on a substrate surface, the process comprising the stages of (1) a pigmented aqueous coating composition containing as the film-forming material a water-thinnable emulsion polymer is applied to the substrate surface as the basecoat coating composition (2) a polymeric film is formed from the composition applied in stage (1)

(3) a transparent topcoat coating composition is applied to the basecoat obtained in this manner and subsequently (4) the basecoat together with the topcoat is dried at temperatures below 80° C., wherein the basecoat coating composition contains a water-thinnable emulsion polymer which is obtained in that (a) in the first stage 10 to 90 parts by weight of an ethylenically unsaturated monomer or a mixture of ethylenically unsaturated monomers is polymerized in the aqueous phase in the presence of one or more emulsifiers and one or more radical-forming initiators, the ethylenically unsaturated monomer or the mixture of ethylenically unsaturated monomers being chosen such that in the first stage a polymer having a glass transition temperature ($T_{G1}$) of +30° to +110° C. is obtained, and (b) after at least 80% by weight of the ethylenically unsaturated monomer or mixture of monomers employed in the first stage have reacted, in a second type stage 90 to 10 parts by weight of an ethylenically unsaturated monomer or a mixture of ethylenically unsaturated monomers are polymerized in the presence of the polymer obtained in the first stage, the monomer employed in the second stage or the mixture of ethylenically unsaturated monomers employed in the second stage being chosen such that a sole polymerization of the monomer employed in the second stage or of the mixture of ethylenically unsaturated monomers employed in the second stage gives rise to a polymer having a glass transition temperature ($T_{G2}$) of −60° to +20° C., and the reaction conditions being chosen such that the resultant emulsion polymer has a number average molecular weight of 200,000 to 2,000,000, and the ethylenically unsaturated monomer or mixture of monomers employed in the first stage and the nature and amount of the ethylenically unsaturated monomer or mixture of monomers employed in the second stage being chosen such that the resultant emulsion polymer has a hydroxyl value of 2 to 100 mg of KOH/g and the difference $T_{G1}-T_{G2}$ is 10° to 170° C.

2. The process as claimed in claim 1, wherein the basecoat coating composition comprises a metal pigment.

3. The process as claimed in claim 1, wherein the film-forming material comprises 100 to 40% by weight of the emulsion polymer and 0 to 60% by weight of a water-thinnable polyuret resin, the amounts in each case being based on the solids content and their total always being 100% by weight.

4. The process as claimed in claim 1 wherein in the first stage a mixture is used comprising:

(a1) 100 to 60,% by weight of a cycloaliphatic or aliphatic ester of methacrylic acid or acrylic acid or a mixture of such esters and (a2) 0 to 40,% by weight of a monomer which is copolymerizable with (a1) or a mixture of such monomers, the total of the weights of (a1) and (a2) being always 100% by weight.

5. The process as claimed in claim 1, wherein in the second stage a mixture is used comprising:
- (b1) 47 to 99,% by weight of a cycloaliphatic or aliphatic ester of methacrylic acid or acrylic acid or a mixture of such esters
- (b2) 1 to 20,% by weight of a monomer which is copolymerizable with (b1), (b3) and (b4) and carries at least one hydroxyl group or a mixture of such monomers
- (b3) 0 to 8,% by weight of a monomer which is copolymerizable with (b1), (b2) and (b4) and carries at least one carboxyl or sulfonic acid group or a mixture of such monomers and
- (b4) 0 to 25,% by weight of a further monomer which is copolymerizable with (b1), (b2) and (b3) or a mixture of such monomers, the total of the weight of (b1), (b2), (b3) and (b4) always 100% by weight.

6. The process as claimed in claim 1, wherein the transparent topcoat coating composition comprises a hydroxyl-containing acrylate copolymer and a blocked diisocyanate and/or polyisocyanate.

7. A process for the production of a multicoat protective and/or decorative coating on a substrate surface in the automotive refinishing sector, the process comprising the stages of
- (1) a pigmented aqueous coating composition comprising as the film-forming material a water-thinnable emulsion polymer is applied to the substrate surface as a basecoat coating composition
- (2) a polymeric film is formed from the composition applied in stage (1)
- (3) a transparent topcoat coating composition is applied to the basecoat obtained in this manner and subsequently
- (4) the basecoat together with the topcoat is dried at temperatures below 100° C., wherein the basecoat coating composition contains a water-thinnable emulsion polymer which is obtained in that
- (a) in the first stage 10 to 90 parts by weight of an ethylenically unsaturated monomer or a mixture of ethylenically unsaturated monomers is polymerized in the aqueous phase in the presence of one or more emulsifiers and one or more radical-forming initiators, the ethylenically unsaturated monomer or the mixture of ethylenically unsaturated monomers being chosen such that in the first stage a polymer having a glass transition temperature ($T_{G1}$) of +30° to +110° C. is obtained, and
- (b) after at least 80% be weight of the ethylenically unsaturated monomer or mixture of monomers employed in the first stage have reacted, in a second stage 90 to 10 parts by weight of an ethylenically unsaturated monomer or a mixture of ethylenically unsaturated monomers are polymerized in the presence of the polymer obtained in the first stage, the monomer employed in the second stage or the mixture of ethylenically unsaturated monomers employed in the second stage being chosen such that a sole polymerization of the monomer employed in the second stage or of the mixture of ethylenically unsaturated monomers employed in the second stage gives rise to a polymer having a glass transition temperature ($T_{G2}$) of −60° to +20° C., and the reaction conditions being chosen such that the resultant emulsion polymer has a number average molecular weight of 200,000 to 2,000,000, and the ethylenically unsaturated monomer or mixture of monomers employed in the first stage and the nature and amount of the ethylenically unsaturated monomer or mixture of monomers employed in the second stage being chosen such that the resultant emulsion polymer has a hydroxyl value of 2 to 100 mg of KOH/g and the difference $T_{G2} - T_{G2}$ is 10° to 170° C.

8. The process as claimed in claim 7, wherein the basecoat is dried together with the topcoat at temperatures below 80° C.

9. The process as claimed in claim 7, wherein the basecoat coating composition comprises a metal pigment.

10. The process as claimed in claim 7, wherein the film-forming material comprises 100 to 40% by weight of the emulsion polymer and 0 to 60% by weight of a water-thinnable polyurethane resin, the amount in each case being based on the solids content and their total always being 100% by weight.

11. The process as claimed in claim 7, wherein in the first stage a mixture is used comprising
- (a1) 100 to 60, % by weight of a cycloaliphatic or aliphatic ester of methacrylic acid or acrylic acid or a mixture of such esters and
- (a2) 0 to 40, % by weight of a monomer which is copolymerizable with (a1) or a mixture of such monomers, the total of the weights of (a1) and (a2) being always 100% by weight.

12. The process as claimed in claim 7, wherein in the second stage a mixture is used comprising
- (b1) 47 to 99, % by weight of a cycloaliphatic or aliphatic ester of methacrylic acid or acrylic acid or a mixture of such esters (b2) 1 to 20, % by weight of a monomer which is copolymerizable with (b1), (b3) and (b4) and carries at least one hydroxyl group or a mixture of such monomers
- (b3) 0 to 8, % by weight of a monomer which is copolymerizable with (b1), (b2) and (b4) and carries at least one carboxyl or sulfonic acid group or a mixture of such monomers and
- (b4) 0 to 25, % by weight of a further monomer which is copolymerizable with (b1), (b2) and (b3) or a mixture of such monomers, the total of the weight of (b1), (b2), (b3) and (b4) being always 100% by weight.

13. The process as claimed in claim 7, wherein the transparent topcoat coating composition comprises a hydroxyl-containing acrylate copolymer and a blocked diisocyanate and/or polyisocyanate.r86

14. The process as claimed in claim 1, wherein in the first stage a mixture is used comprising:
- (a1) 99.5 to 75% by weight of a cycloaliphatic or aliphatic ester of methacrylic acid or acrylic acid or a mixture of such esters and
- (a2) 0.5 to 25% by weight of a monomer which is copolymerizable with (a1) or a mixture of such monomers, the total of the weights of (a1) and (a2) being always 100% by weight.

15. The process as claimed in claim 1, wherein in the second stage a mixture is used comprising:
- (b1) 75 to 90% by weight of a cycloaliphatic or aliphatic ester of methacrylic acid or acrylic acid or a mixture of such esters
- (b2) 5 to 15% by weight of a monomer which is copolymerizable with (b1), (b3) and (b4) and carries at least one hydroxyl group or a mixture of such monomers (b3) 2 to 6% by weight of a monomer which is copolymerizable with (b1), (b2) and (b4) and carries at least one carboxyl or sulfonic acid group or a mixture of such monomers and
(b4) 2 to 15% by weight of a further monomer which is copolymerizable with (b1), (b2) and (b3) or a mixture of such monomers, the total of the weight of (b1), (b2), (b3) and (b4) being always 100% by weight.

16. The process as claimed in claim 7, wherein in the first stage a mixture is used comprising
(a1) 99.5 to 75% by weight of a cycloaliphatic or aliphatic ester of methacrylic acid or acrylic acid or a mixture of such esters and
(a2) 0.5 to 25% by weight of a monomer which is copolymerizable with (a1) or a mixture of such monomers, the total of the weights of (a1) and (a2) being always 100% by weight.

17. The process as claimed in claim 7, wherein in the second stage a mixture is used comprising (b1) 75 to 90% by weight of a cycloaliphatic or aliphatic ester of methacrylic acid or acrylic acid or a mixture of such esters
(b2) 5 to 15% by weight of a monomer which is copolymerizable with (b1), (b3) and (b4) and carries at least one hydroxyl group or a mixture of such monomers
(b3) 2 to 6% by weight of a monomer which is copolymerizable with (b1), (b2) and (b4) and carries at least one carboxyl or sulfonic acid group or a mixture of such monomers and
(b4) 2 to 15% by weight of a further monomer which is copolymerizable with (b1), (b2) and (b3) or a mixture of such monomers, the total of the weight of (b1), (b2), (b3) and (b4) being always 100% by weight.

18. The process as claimed in claim 1, wherein the basecoat coating composition comprises an aluminum pigment.

19. The process as claimed in claim 7, wherein the basecoat coating composition comprises an aluminum pigment.

* * * * *